United States Patent
Lajoie

(10) Patent No.: US 9,223,488 B1
(45) Date of Patent: Dec. 29, 2015

(54) NAVIGABLE INTERFACES FOR GRAPHICAL REPRESENTATIONS

(75) Inventor: Dave Lajoie, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 980 days.

(21) Appl. No.: 13/116,178

(22) Filed: May 26, 2011

(51) Int. Cl.
*G06F 3/048* (2013.01)
*G06F 3/0485* (2013.01)

(52) U.S. Cl.
CPC ..................... *G06F 3/0485* (2013.01)

(58) Field of Classification Search
CPC ..................................... G06F 3/0485
USPC ................................. 715/801, 781
See application file for complete search history.

(56) References Cited

U.S. PATENT DOCUMENTS

| | | | | |
|---|---|---|---|---|
| 5,339,390 | A * | 8/1994 | Robertson et al. | 715/782 |
| 5,546,529 | A * | 8/1996 | Bowers et al. | 715/848 |
| 5,619,632 | A * | 4/1997 | Lamping et al. | 345/441 |
| 5,678,015 | A * | 10/1997 | Goh | 715/782 |
| 5,689,287 | A * | 11/1997 | Mackinlay et al. | 345/427 |
| 5,786,820 | A * | 7/1998 | Robertson | 715/853 |
| 5,920,327 | A * | 7/1999 | Seidensticker, Jr. | 345/561 |
| 6,085,202 | A * | 7/2000 | Rao et al. | 715/201 |
| 6,646,652 | B2 * | 11/2003 | Card et al. | 345/645 |
| 6,683,619 | B1 * | 1/2004 | Samra | 345/619 |
| 7,392,488 | B2 * | 6/2008 | Card et al. | 715/853 |
| 7,409,248 | B2 | 8/2008 | Davignon et al. | |
| 7,467,356 | B2 * | 12/2008 | Gettman et al. | 715/850 |
| 7,487,462 | B2 * | 2/2009 | Good et al. | 715/778 |
| 7,536,645 | B2 | 5/2009 | Ducharme | |
| 7,594,180 | B1 | 9/2009 | Langmacher et al. | |
| 7,596,757 | B2 | 9/2009 | Kowalski et al. | |
| 7,712,043 | B2 * | 5/2010 | Li et al. | 715/781 |
| 7,860,691 | B2 | 12/2010 | Beltran et al. | |
| 7,945,863 | B1 | 5/2011 | Reid et al. | |
| 8,212,806 | B2 | 7/2012 | Maillot et al. | |
| 8,230,359 | B2 * | 7/2012 | Robertson et al. | 715/801 |
| 8,381,126 | B2 * | 2/2013 | Gould | 715/801 |
| 8,782,596 | B2 * | 7/2014 | Hayles | 717/105 |
| 8,788,974 | B2 * | 7/2014 | Perl et al. | 715/853 |

(Continued)

OTHER PUBLICATIONS

Steinberg, Saul, "View of the World from 9th Avenue", Mar. 29, 1976, The New Yorker, described by Wikipedia, retrieved Nov. 21, 2014. 5 pgs.*

(Continued)

*Primary Examiner* — Steven Sax
*Assistant Examiner* — Wilson Varga
(74) *Attorney, Agent, or Firm* — Kilpatrick Townsend & Stockton LLP

(57) ABSTRACT

A system includes a computing device that includes a memory configured to store instructions. The computing device also includes a processor configured to execute the instructions to perform a method that includes defining a first portion of a display as a workspace for a graphical representation of a portion of a network of processing operations. The workspace provides a navigable view of the graphical representation for editing the displayed portion of the network. The method also includes defining at least a second portion of the display, different from first portion, for a compressed view of a portion of the network of processing operations external to the first portion of the display. The method also includes simultaneously presenting the first portion and the second portion on the display.

20 Claims, 10 Drawing Sheets

(56) References Cited

U.S. PATENT DOCUMENTS

| | | | |
|---|---|---|---|
| 8,793,599 B1 | 7/2014 | Lajoie et al. | |
| 2002/0113816 A1* | 8/2002 | Mitchell et al. | 345/734 |
| 2002/0167551 A1* | 11/2002 | Steele et al. | 345/853 |
| 2003/0231213 A1* | 12/2003 | Gould et al. | 345/782 |
| 2004/0066411 A1* | 4/2004 | Fung et al. | 345/781 |
| 2005/0172242 A1 | 8/2005 | Vienneau et al. | |
| 2005/0188325 A1* | 8/2005 | Kolman et al. | 715/781 |
| 2008/0148181 A1* | 6/2008 | Reyes et al. | 715/801 |
| 2008/0270886 A1* | 10/2008 | Gossweiler et al. | 715/227 |
| 2009/0183093 A1 | 7/2009 | Ducharme | |
| 2010/0037136 A1* | 2/2010 | Choudhary et al. | 715/708 |
| 2011/0010647 A1 | 1/2011 | Ducharme | |
| 2013/0013264 A1 | 1/2013 | Narayan et al. | |
| 2013/0047123 A1* | 2/2013 | May et al. | 715/834 |
| 2013/0159936 A1* | 6/2013 | Yamaguchi et al. | 715/850 |

OTHER PUBLICATIONS

Saker, Manojit et al., "Graphical Fisheye Views", Sep. 1993, Brown University, CS 93-40. 29 pgs.*

Notice of Allowance, dated Mar. 14, 2014, in U.S. Appl. No. 13/209,771.

Final Office Action, dated Nov. 8, 2013, in U.S. Appl. No. 13/209,771.

Non-Final Office Action, dated May 10, 2013, in U.S. Appl. No. 13/209,771.

Author Unknown, "3D modeling, animation, and rendering software," Autodesk® 3ds Max®. Accessed on Jan. 6, 2015, 3 pages. Retrieved from: http://www.autodesk.com/products/3ds-max/overview.

Author Unknown, "Maya—Comprehensive 3D animation software," Autodesk® Maya®. Accessed on Jan. 6, 2015, 3 pages. Retrieved from: http://www.autodesk.com/products/maya/overview.

Author Unknown, "Autodesk Softimage 2013," Autodesk® Softimage®. Accessed on Jan. 6, 2015, 2 pages. Retrieved from: http://area.autodesk.com/2014unfold/products/softimage.html.

Author Unknown, "Houdini 3D Animation Tools," Houdini®. Accessed on Jan. 6, 2015, 2 pages. Retrieved from: http://www.sidefx.com/index.php?option=com_content&task=blog-category&id=216&Itemid=379.

Author Unknown, "Nuke," The Foundry®. Accessed on Jan. 6, 2014, 3 pages. Retrieved from: https://www.thefoundry.co.uk/products/nuke/.

Author Unknown, "Luxology modo 501," SolidSmack. Accessed Jan. 6, 2014, 21 pages. Retrieved from http://www.solidsmack.com/cad-design-news/luxology-modo-501-first-look-features.

Author Unknown, "Shake 4 User Manual," Apple Inc. ©. Accessed Jan. 6, 2014, 1054 pages. Retrieved from http://www.apple.com/support/shake/.

Scholl, Laura, "Mental Mill, using mental images' mental mill to bring life to shader creations," CGSociety, dated Feb. 10, 2009. Accessed on Jan. 6, 2015, 4 pages. Retrieved from http://www.cgsociety.org/index.php/CGSFeatures/CGSFeatureSpecial/mental_mill.

* cited by examiner

NAVIGABLE INTERFACES FOR GRAPHICAL REPRESENTATIONS

TECHNICAL FIELD

This document relates to systems and techniques for producing and presenting graphical representations of information such as complex networks (e.g., networks of processing nodes for defining simulated materials) by displaying a portion of the network in a navigable workspace and a compressed representation of the network external to the workspace.

BACKGROUND

With ever-increasing computational power and resources, increasingly complex calculations can be efficiently computed in smaller and smaller periods of time. While quickly computable, the underlying processing operations can reach levels of complexities that may become difficult to comprehend at both micro and macro levels. For example, detailed computational operations may be understandable if reviewed at a level such that each operation is individually resolvable. However, relations between the individual operations and the overall computational goals may be difficult to identify, track and confirm.

SUMMARY

The described systems and techniques are for presenting a graphical representation that provides both the level of detail of editing individual operations while also providing an overall context. Along with allowing a user to navigate to different regions of a network of complex operations, a compressed representation of the network provides an overall context to the user (e.g., a designer, developer, etc.).

In one aspect, a computer-implemented method includes defining a first portion of a display as a workspace for a graphical representation of a portion of a network of processing operations. The workspace provides a navigable view of the graphical representation for editing the displayed portion of the network. The method also includes defining at least a second portion of the display, different from first portion, for a compressed view of a portion of the network of processing operations external to the first portion of the display. The method also includes simultaneously presenting the first portion and the second portion on the display.

Implementations may include any or all of the following features. The workspace of the first portion of the display and the compressed view of the second portion of the display may be updated upon the graphical representation being navigated to present another portion of the network in the first portion of the display. The second portion of the display may be located at least at one boundary of the display. The second portion of the display may encompass the first portion of the display. The compressed view of the portion of the network may include a graphical element for representing a collection of processing nodes. The compressed view of the portion of the network may include a graphical element for representing a processing node connector. A connection may be established between a portion of the network represented in the compressed view and a portion of the network represented in the workspace. One or more rules may be applied to the compressed view network of processing operations. The network of processing operations may represent operations for defining a simulated material. Updating may include presenting content represented in the compressed view in the workspace.

In another aspect, a system includes a computing device that includes a memory configured to store instructions. The computing device also includes a processor configured to execute the instructions to perform a method that includes defining a first portion of a display as a workspace for a graphical representation of a portion of a network of processing operations. The workspace provides a navigable view of the graphical representation for editing the displayed portion of the network. The method also includes defining at least a second portion of the display, different from first portion, for a compressed view of a portion of the network of processing operations external to the first portion of the display. The method also includes simultaneously presenting the first portion and the second portion on the display.

Implementations may include any or all of the following features. The processor may be further configured to execute the instructions to perform a method that includes updating the workspace of the first portion of the display and the compressed view of the second portion of the display upon the graphical representation being navigated to present another portion of the network in the first portion of the display. The second portion of the display may be located at least at one boundary of the display. The second portion of the display may encompass the first portion of the display. The compressed view of the portion of the network may include a graphical element for representing a collection of processing nodes. The compressed view of the portion of the network may include a graphical element for representing a processing node connector. A connection may be established between a portion of the network represented in the compressed view and a portion of the network represented in the workspace. One or more rules may be applied to the compressed view network of processing operations. The network of processing operations may represent operations for defining a simulated material. Updating may include presenting content represented in the compressed view in the workspace.

In another aspect, a computer program product tangibly embodied in an information carrier and comprising instructions that when executed by a processor perform a method that includes defining a first portion of a display as a workspace for a graphical representation of a portion of a network of processing operations. The workspace provides a navigable view of the graphical representation for editing the displayed portion of the network. The method also includes defining at least a second portion of the display, different from first portion, for a compressed view of a portion of the network of processing operations external to the first portion of the display. The method also includes simultaneously presenting the first portion and the second portion on the display.

Implementations may include any or all of the following features. Further instructions may be included that when executed by a processor perform a method that includes updating the workspace of the first portion of the display and the compressed view of the second portion of the display upon the graphical representation being navigated to present another portion of the network in the first portion of the display. The second portion of the display may be located at least at one boundary of the display. The second portion of the display may encompass the first portion of the display. The compressed view of the portion of the network may include a graphical element for representing a collection of processing nodes. The compressed view of the portion of the network may include a graphical element for representing a processing node connector. A connection may be established between a portion of the network represented in the compressed view and a portion of the network represented in the workspace. One or more rules may be applied to the compressed view network of processing operations. The network of processing operations may represent operations for defining a simulated material. Updating may include presenting content represented in the compressed view in the workspace.

Details of one or more implementations are set forth in the accompanying drawings and the description below. Other features, aspects and advantages will be apparent from the description and drawings, and from the claims.

DETAILED DESCRIPTION

Figure 1:
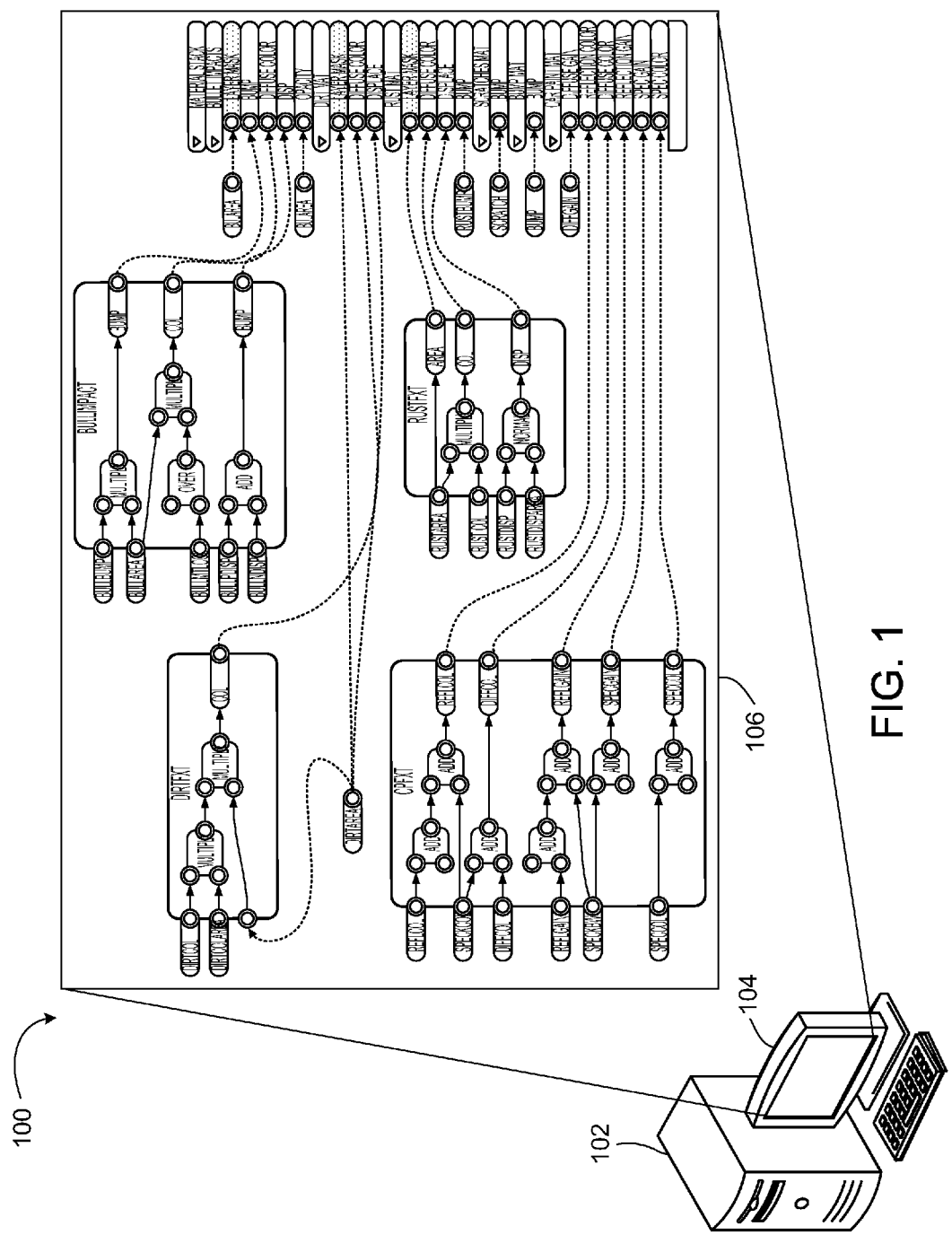
FIGS. 1 and 2 illustrate a graphical representation of a network of processing operations.

FIG. 1 illustrates a computational system 100 for developing and editing representations of processing networks for performing computational operations for various applications. For example, the network of processing operations may be graphically represented with processing nodes that are connected for linking the operations in one or more appropriate sequences. However, with the development of more efficient and powerful computational resources (e.g., processors, memory, etc.), computational solutions for more complex processes and applications can be realized. However, increased complexity may result in more and more processing operations needed to attain a computational solution. Correspondingly, graphical representations of the processing operations, which may be used for visual assistance, may increase in size (e.g., the number of processing nodes) and complexity (e.g., the number of interconnections among the processing nodes). As such, the graphical representations may become unwieldy for a developer or designer to manage, edit and further develop. For example, while a designer may be able to focus on one small portion of a graphical representation (e.g., that may represent tens of operational nodes), the overall processing context provided by the graphical representation may become confusing to the designer or worse, lost entirely.

In this particular example, the system 100 includes a computing device (e.g., a computer system 102) that is used for designing complex processing operations by allowing a user to graphically represent and edit the operations. To view the graphical representation, a display 104 (connected to the computer system 102) presents a graphical user interface (GUI) 106 that includes a graphical representation of the processing operations under development. Along with individual operations being represented by processing nodes, the graphical representation also includes graphical lines that represent node connections (e.g., inputs, outputs, relational connections, dataflow connections, behavioral connections, etc.). While this graphical representation may be considered manageable in regards to a designer being able to quickly understand each individual operation and the overall processing objective, as operations are added to the representation and become more complex, being able to retain such an understanding may become difficult.

Figure 2:
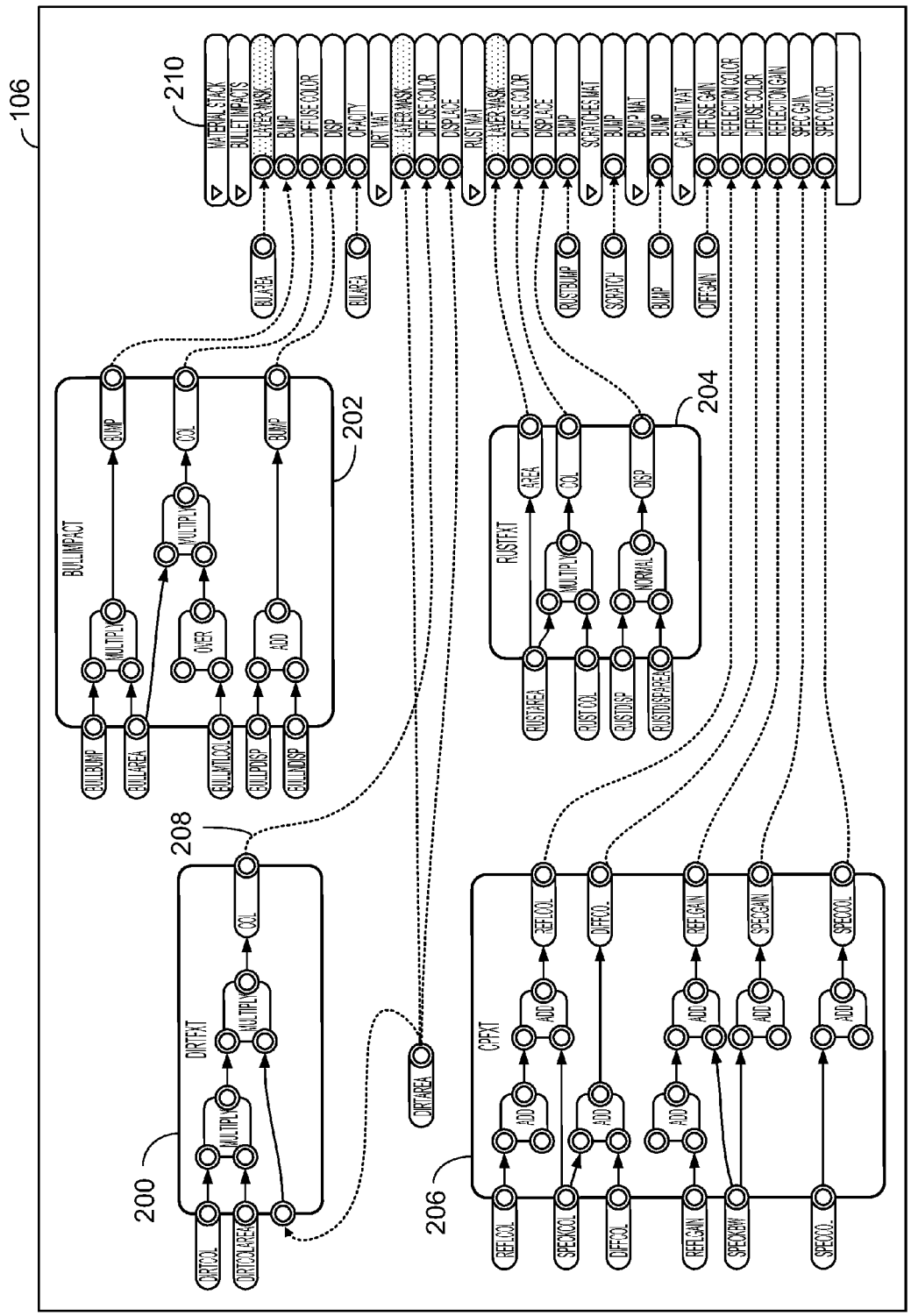

Referring to FIG. 2, an expanded view of the GUI 106 (shown in FIG. 1) is presented that includes graphical representations of the processing operations and interconnections between the operations. For example, collections of operator nodes 200, 202, 204, 206 are represented in which each collection includes nodes for processing data (e.g., add data sets, multiply data sets, etc.). Input terminals to each of the collections provide data for processing and connection lines (e.g., represented with dashed line 208), provide processed data to one or more other collections of nodes for further processing or to an output terminal 210 (e.g., to provide the processed data to another portion of the graphical representation or to another GUI for further processing, etc.). For illustrative purposes, the operations and processing represented in GUI 106 may not be considered overly complex. However, hundreds or even thousands of processing operations may be needed for some applications. As such, viewing all of the nodes and connections graphically representing such applications, the GUI may need to be visually scaled to a level that may be difficult to view if not completely unrecognizable. Further, by visually zooming into a particular region of the representation to inspect or edit (e.g., nodes, connections, etc.), the user may lose context to the overall processing being graphically represented. Alternatively, zooming out for an all-encompassing view may reduce graphical elements to a size unrecognizable by a user (and too small for interaction). In this particular example, the processing operations defined by the nodes in the GUI 106 are associated with simulating a material (e.g., rusty metal with a scratched and bumpy surface) for use as digital media (e.g., video content) in offline productions (e.g., animated motion pictures) or online projects (e.g., video game titles, CAD/CAM, etc.). Similar to other processing applications, creating seemingly realistic looking materials may call for a significant amount of simulation processing. As such, hundreds or even thousands of processing nodes and connections may be needed. With such detail, a designer may have trouble retaining how small collections of node are interrelated (e.g., are connected across wide spans of a large graphical representation) or their relationships within the context of the processing graphically represented in the GUI. Similar difficulties may be related to other applications. For example, graphically representing schematic diagrams for circuits, integrated circuit (IC) chip layouts and other type of applications may present similar contextual difficulties.

Figure 3:
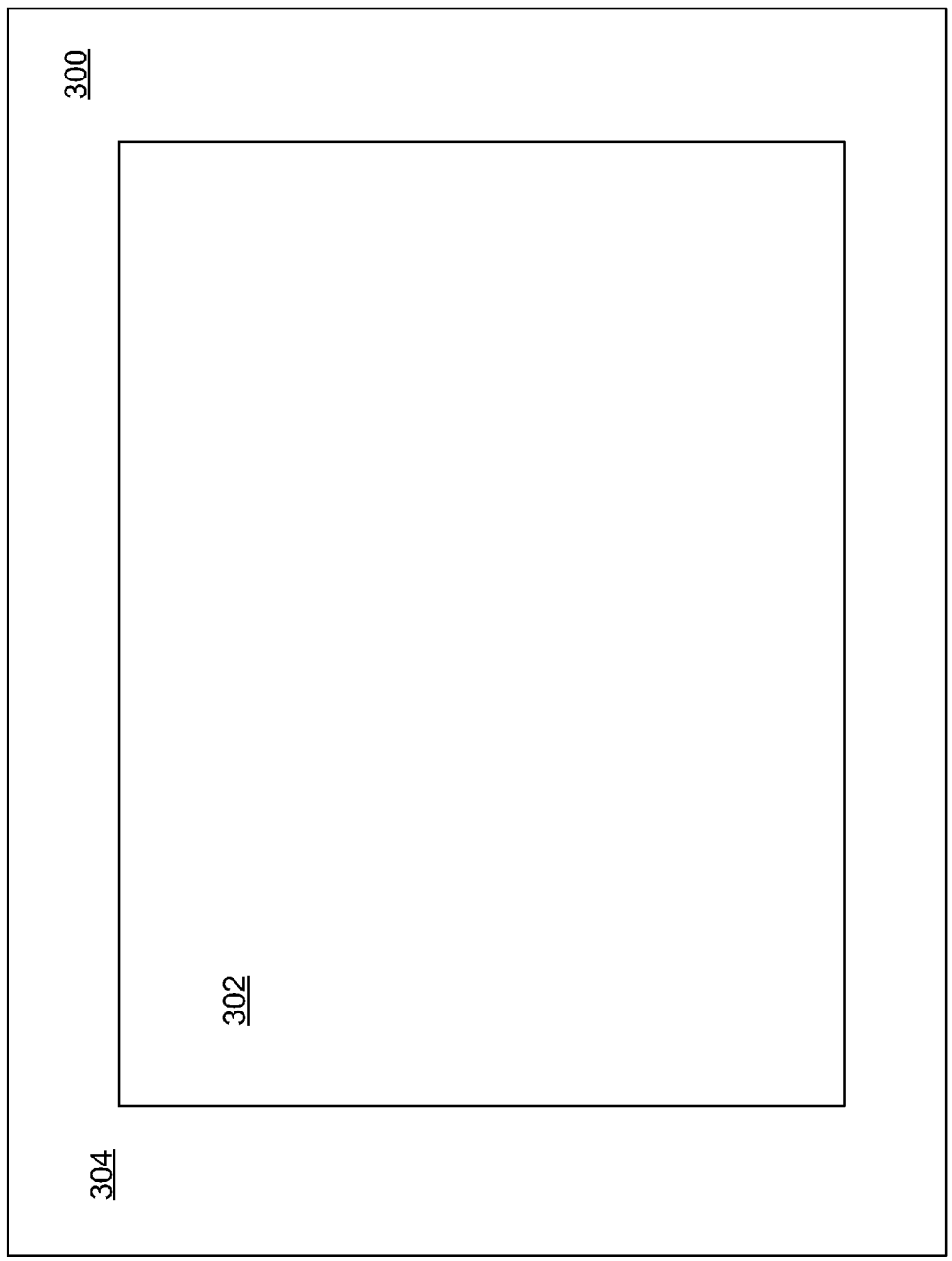
FIG. 3 illustrates portions of a user interface that includes a workspace and a compressed portion of a graphical representation.

Referring FIG. 3, one or more techniques or methodologies may be implemented to address contextual difficulties presented by graphical representations of processing operations (or other applications). For example, rather than just presenting the graphical representation, a GUI may be segmented into multiple portions to provide a user with the level of detail needed to produce and edit processing operations while also providing the user with a global context of the overall processing goal. In one arrangement, one portion of the GUI may allow a user to visually navigate and zoom into and out of different regions of the graphical representation of the processing operations. Within this portion of the GUI, a user can review and edit the processing operations (e.g., add and remove processing nodes, connect and disconnect node inputs and outputs, etc.) at the level of detail needed. This portion of the GUI may also allow the user to navigate to other regions of the graphical representation to continue to review or edit the content that represents the processing operations.

For example, pointing devices (e.g., a mouse, stylus, etc.) may be controlled by a user for panning to one or more regions of the graphical representation (e.g., move to another collection of processing nodes). In this particular illustrated example, a GUI 300 includes a workspace 302 that is located at the inner portion of the GUI. In general, the workspace 302 can present a relatively detailed view of a graphical representation, e.g., that represents a collection of processing nodes and interconnections. Along with presenting the content, the workspace can be updated as needed (e.g., as the user directs the GUI 300 to present another portion of the graphical representation). The GUI 300 also includes a portion 304 that represents the portion of the graphical representation that is located outside of the workspace 302. For example, as the workspace 302 presents a particular region of a graphical representation (e.g., a small collection of processing nodes), the portion 304 of the GUI 300 graphically represents that remaining portion of the graphical representation (e.g., processing nodes not included in the small collection presented in the workspace). As such, a user is provided both a detailed view of a region of interest (e.g., for editing processing nodes within the region) and a global view of the overall graphical representation (e.g., all processing nodes and connections that lay outside the region of interest). Provided such multiple levels of information, a user may be capable of focusing on details of one or two processing operations (e.g., establishing a connection between two nodes), while still being able to merely glance at another portion of the GUI to view of the overall context of the processing operations. By providing such levels of information on a single display, a user is also not distracted by jumping from one view to another (to understand the relationship among different regions of the graphical representation). Further, the amount of display space used for viewing a region of interest and a global view may be adjustable. For example, a user may assign space to each region (e.g., increase global view space for presenting more details of the content external to the region of interest). Predefined processes, rules, etc. may also be used for defining the space for displaying such regions.

In this illustrated example, the workspace 302 is located within the interior of the GUI 300 and is encompassed by the portion 304 of the GUI that presents content of a graphical representation (e.g., processing nodes) located outside of the workspace. However, other layouts and types of user interfaces may be used to present such content. For example, multiple workspaces may be included in a GUI to present more than one region of interest. Similarly, context to an overall processing system may be provided by multiple portions (rather than a single portion 304). For example, a series of frames may encompass (form rings around) the workspace 302 such that more details may be represented in the inner frames (e.g., since they include content proximate to the content of the workspace) and less detail is represented in the outer frames (e.g., since they include content that may be considered more distant to the content of the workspace). Along with using different types of layouts to present the workspace and the overall context of a graphical representation (e.g., of a system of processing operations), the GUI 300 may also use different types of graphics and graphical elements for representing content.

Figure 4:
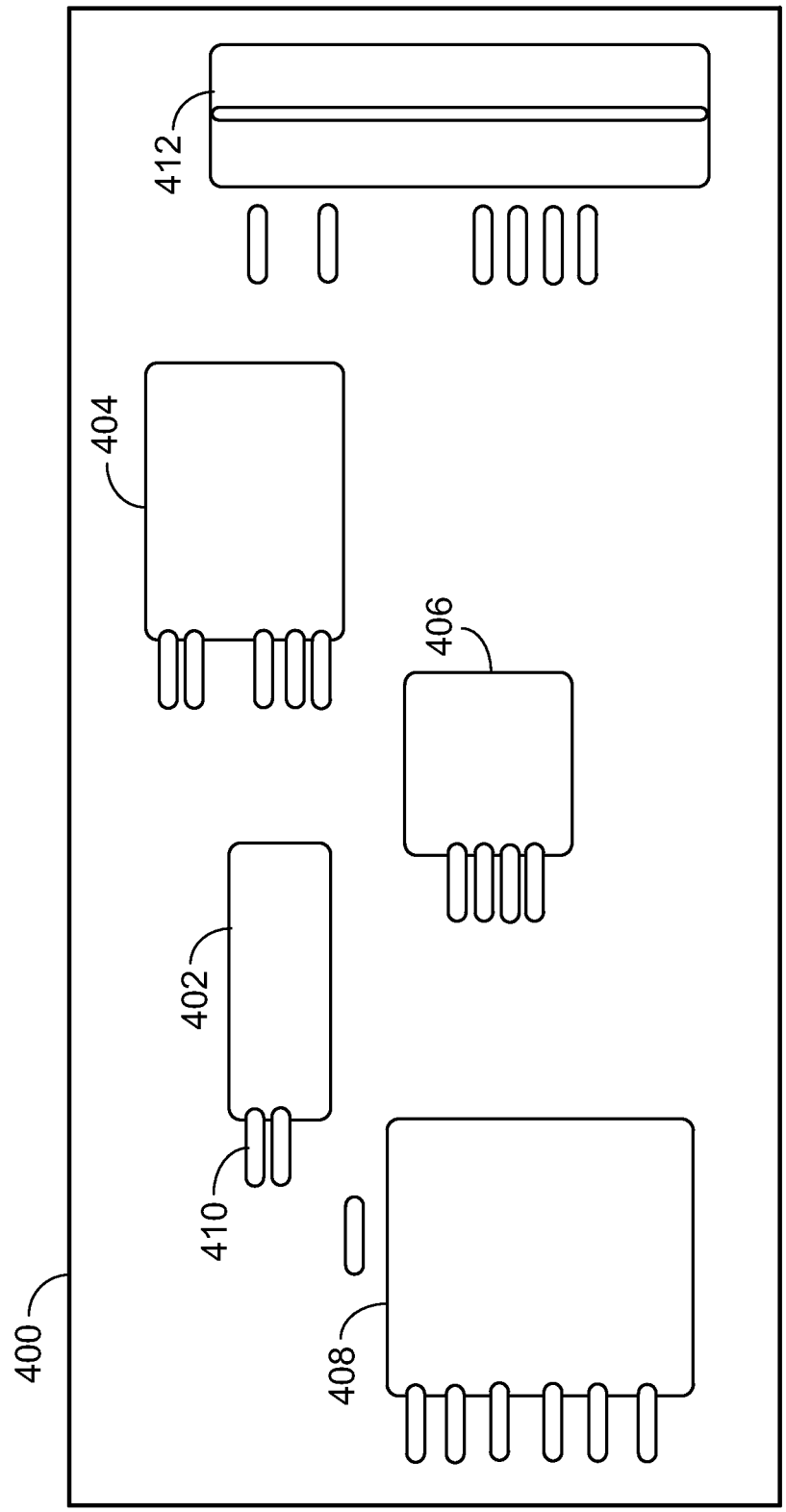
FIGS. 4, 5 and 6 illustrate graphically compressing a portion of a network of processing operations.
Figure 5:
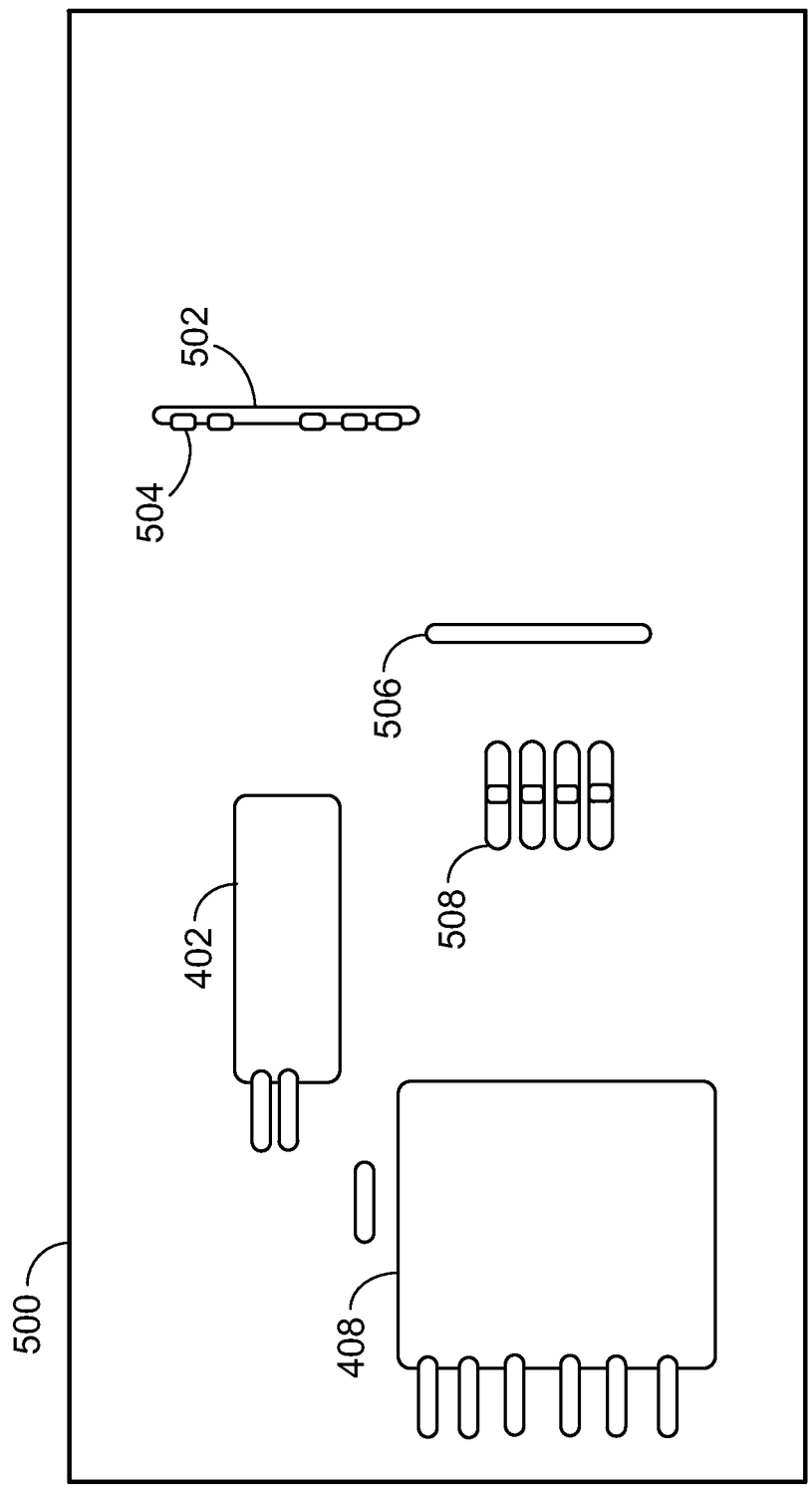
Figure 6:
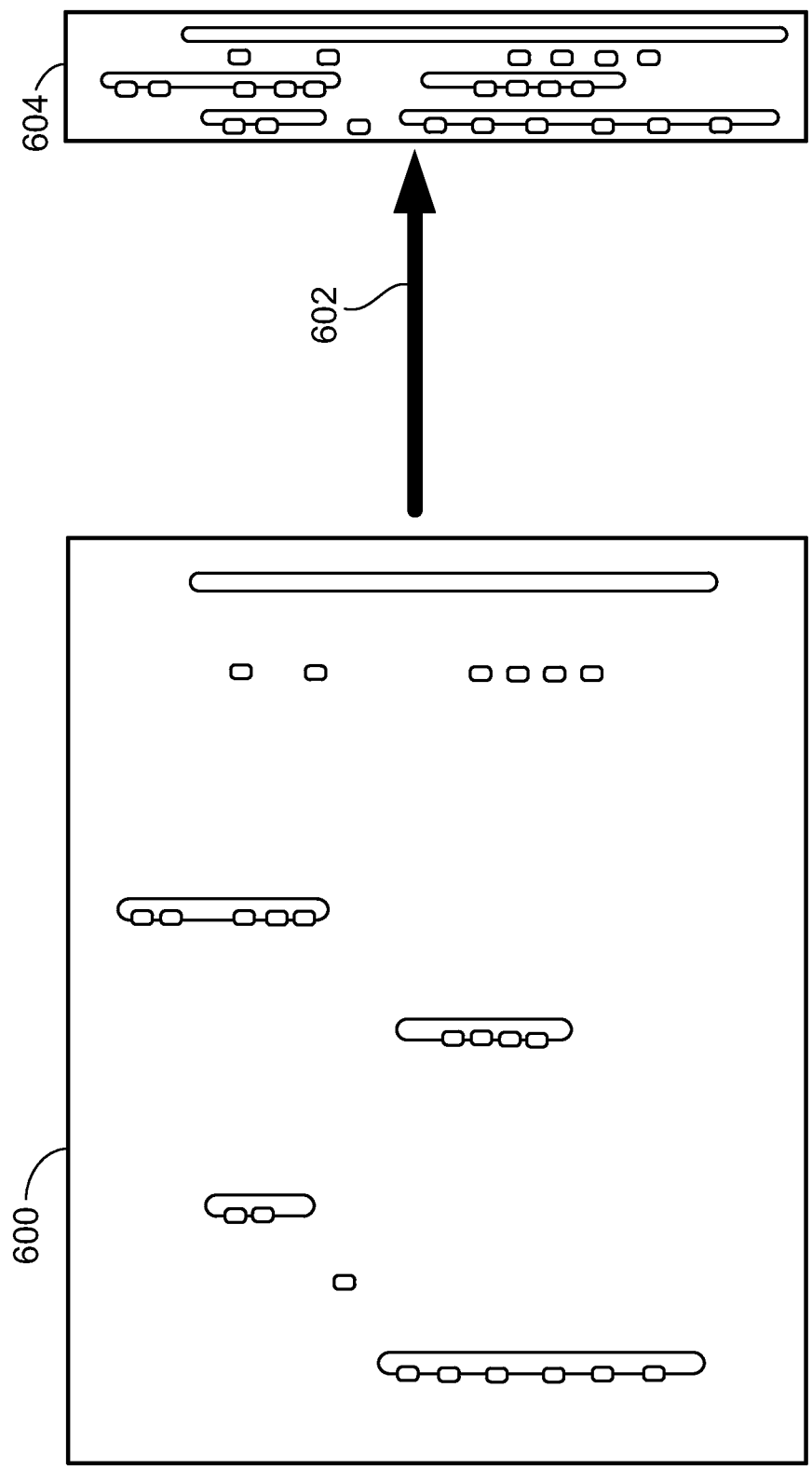

Referring to FIGS. 4-6, a series of illustrations represent using graphics and graphical elements to depict a network of processing operation in a reduced space. For example, such a compressed representation could be used in the portion of a GUI (e.g., portion 304 shown in FIG. 3) to provide an overall context to a user. Referring to FIG. 4, as represented in a GUI 400, initially each collection of processing nodes is represented by a single graphic. Using the processing node collections 200-206 shown in FIG. 2 for demonstration, corresponding graphical elements 402-408 are represented in the GUI 400 at approximately the same locations and having equivalent sizes of the node collections 200-206. Along with the processing node collections, input connections are also represented by graphical elements (e.g., graphical element 410), for example, for corresponding inputs to each of the node collections and the output terminal 210 (which is also represented by a graphical element 412). In some implementations that inputs connections may be considered as source nodes that provide data (e.g., imagery, signals, etc.). Additionally, in some arrangements input and output connections may be hidden from view, but may automatically appear (e.g., when a user attempts to establish a connection). Along with providing data to be consumed, source nodes may be moved (as directed by a user) to various locations to provide data (e.g., by establishing connections).

In this example, the graphical elements are used that are generally equivalent in size and shape to the respective node collections, source nodes (e.g., input connections, output terminals, etc.). However, other shapes and graphical attributes may be used in some arrangements. For example, different colors, shapes and styles may be used to represent different or similar components of a network of processing nodes or for other application types. Also, individual processing nodes (contained in a collection of nodes) may be represented by a graphical element. In this particular example, connections between the processing nodes (represented with graphical lines in FIG. 2) are not represented by graphics or graphical elements in the illustration. However, such connections may be represented in some arrangements. Additionally, while source nodes are presented, input connectors and output terminals are hidden (though they could be presented in some implementations).

Referring to FIG. 5, along with representing network components as graphical elements (with different graphical attributes), the graphical elements may be adjusted for placement within appropriate locations of a GUI. For example, if determined that a network component (e.g., a collection of processing nodes) is not being represented in the workspace of the GUI, the corresponding graphical element that represents the network component may be adjusted (e.g., compressed) for inclusion in a portion of the GUI external to the workspace. Continuing with the example illustrated in FIG. 4, each of the illustrated graphical elements is not being represented in the workspace of the GUI. As such each of the graphical elements is to be adjusted, in this example, to be shown outside of the workspace. One or more techniques may be used for adjusting the graphical elements, for example, the elements may be compressed in a similar manner such that the spatial relationship among the elements may be retained. At the particular time instance represented in FIG. 5, some of the graphical elements have been compressed while others are illustrated as in the process of being compressed or soon to be compressed. For example, element 502 (which corresponds to element 404 in FIG. 4) is illustrated as being compressed into an elongated shape (from the rectangular shape shown in FIG. 4). Similarly, the input connectors (e.g., connector 504) are illustrated in a compressed form (compared to the larger shape illustrated in FIG. 4). Element 506 (which corresponds to graphical element 406 in FIG. 4) has also been compressed in a manner similar to element 502. Input connectors for the element 506 (e.g., connector 508) are still represented in an elongated form and are about to be compressed. Similarly, graphical elements 402 and 408 are not yet compressed and are represented in FIG. 5 as they are represented in FIG. 4.

Referring to FIG. 6, upon compressing each graphical element as needed, the relative spacing of the elements may also be compressed (e.g., for presenting in a portion of a GUI external to a workspace). In this particular illustration, each of the elements representing collections of processing nodes, input connectors, and an output terminal have been compressed (e.g., into elongated vertical forms), as illustrated in a GUI 600. As represented by a processing arrow 602, the relative spacing among the compressed graphical elements in the GUI 600 is compressed so that the content can be represented in a reduced size space. For example, by compressing the contents and the spacing of the GUI 600, the compressed contents can be represented in a smaller portion 604 of a GUI while still retaining the overall spatial relationships among the graphical elements. By presenting such a representation, a user may be able to visually understand the overall context represented by the reduced size graphics. Further, by using different colors or other graphical attributes, the user may retain a mental model of the overall system along with relationships among the represented components and the functionality of each node. In some arrangements element in a workspace or a compressed portion (or both) may be grouped to form clusters to further provide a visual aid. For example, predefined rules (or other techniques) may be used to group a relatively large group of elements (e.g., a hundred or a thousand nodes) into a cluster that provides the functionality of each cluster member.

Figure 7:
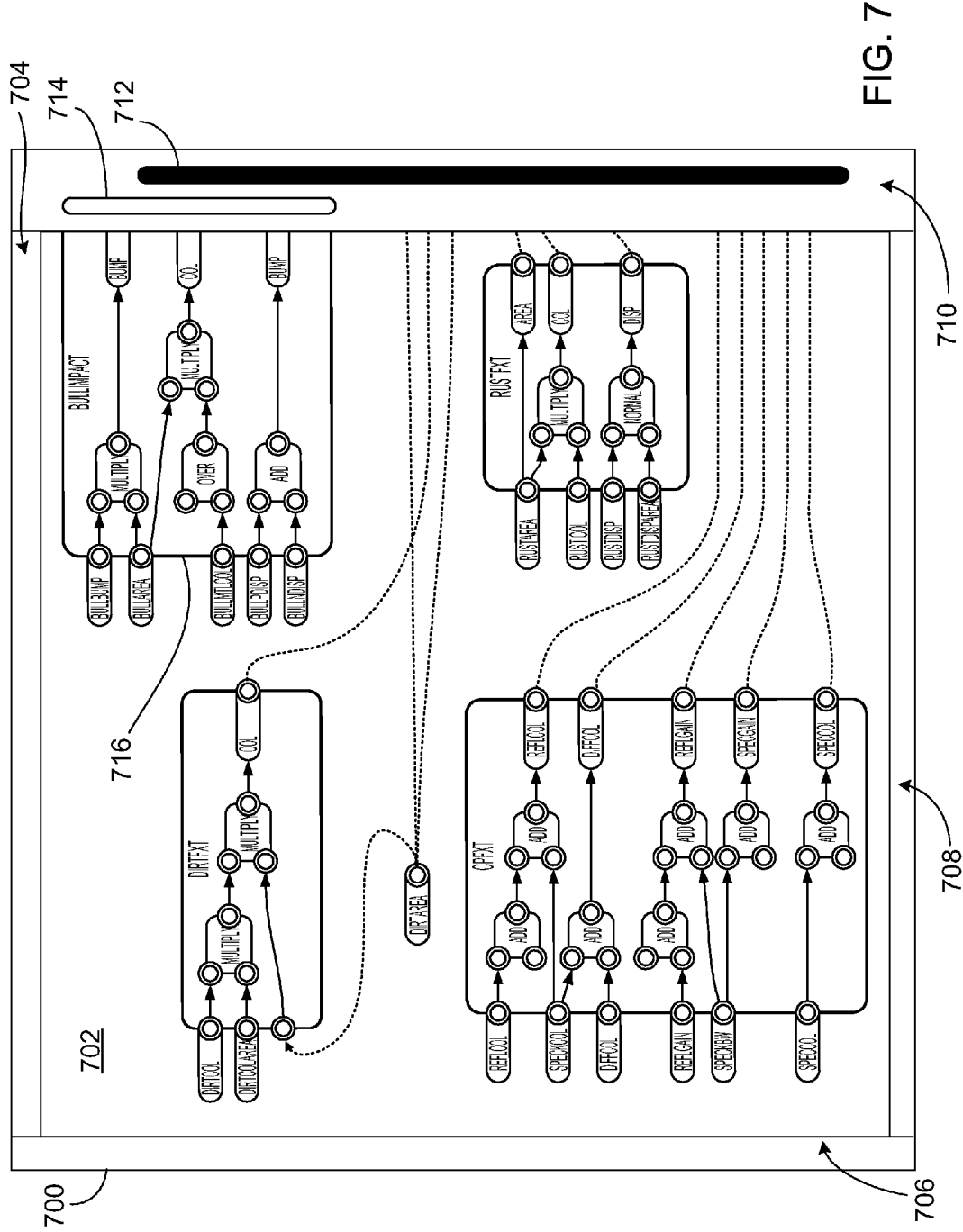
FIGS. 7 and 8 illustrate a user interface that includes a navigable workspace and compressed graphical representations of a network of processing operations.

Referring to FIG. 7, along with appropriately presenting network components in a workspace of a GUI and determining which components to compress for presentation in another portion of the GUI, both portions of the GUI may be dynamically updated. For example, directed by a user to present another region of interest in the workspace, the contents presented in the workspace may be updated along with the compressed contents that represent the network components outside the workspace. Through such updates, the user is consistently provided a region of interest of the network (e.g., for review, editing, etc.) along with the overall relationship of the region with the entire graphical representation of the network of processing operations. In some arrangements, the user may select (e.g., with a pointing device) one or more compressed graphical elements for presenting expanded representation(s). One or more techniques may also be used to establish connections between workspace components and compressed components. For example, being unable to view the inputs to a compressed component, a drop-down menu may be presented for selecting an input when a user attempts to establish a connection between one or more workspace components and a compressed component. In this particular illustration, a GUI 700 includes a workspace 702 that presents a region of interest of a network of processing operations (which is also represented in FIG. 2). The GUI 700 also includes a portion for presenting a compressed representation of the portion of the network that is located outside of the region represented in the workspace 702. In this arrangement, the portion of the GUI 700 for presenting compressed content is located at the four boundaries of the rectangular shaped GUI. For example, a portion 704 presents compressed representations of the network located above the workspace 702, a portion 706 presents compressed representations of the network located to the left of the workspace, a portion 708 presents compressed representations of the network located below the workspace, and a portion 710 presents compressed representations of the network located to the right of the workspace. In this example, portions 704, 706 and 708 appear empty since the relatively simplistic network does not include components located above, to the left and below the components represented in the workspace 702. However, based upon the region of the network displayed in the workspace 702, components of the processing node network are located to the right of the workspace. In particular, portion 710 presents one compressed graphical element 712 that represents an output terminal (e.g., the output terminal 210 shown in FIG. 2) and another compressed graphical element 714 that represents the collection of processing nodes 716 (e.g., the collection 202 also shown in FIG. 2) that is partially represented in the workspace 702 and partially located outside the workspace. As such, two compressed graphical elements in portion 710 of the GU 700 represents the network components external to the workspace 702 and provides a global perspective to the user working within the workspace 702 (e.g., reviewing connections, editing nodes, etc.). However, by navigating to a nearby or relatively remotely located portion of the network, the contents presented in the workspace 702 and the portions 704, 706, 708, 710 of the GUI 700 can be appropriately updated. Similar to using four boundaries, the corners of the rectangular shaped GUI may be used for presenting compressed representations. Other geometries (e.g., circular geometries) may also be utilized, individually or in combination with a rectangular shaped GUI. Furthermore, while the processing flow for this example can be considered from left to right, other processing conventions (e.g., right to left, below to above, etc.) may be implemented. Further, different types of components and component features may be presented in a compressed representation. For example, compressed representations of sources may be represented in some compressed views (e.g., to the right of a workspace) while inputs and outputs are represented in other compressed portions (e.g., to the left of a workspace).

Figure 8:
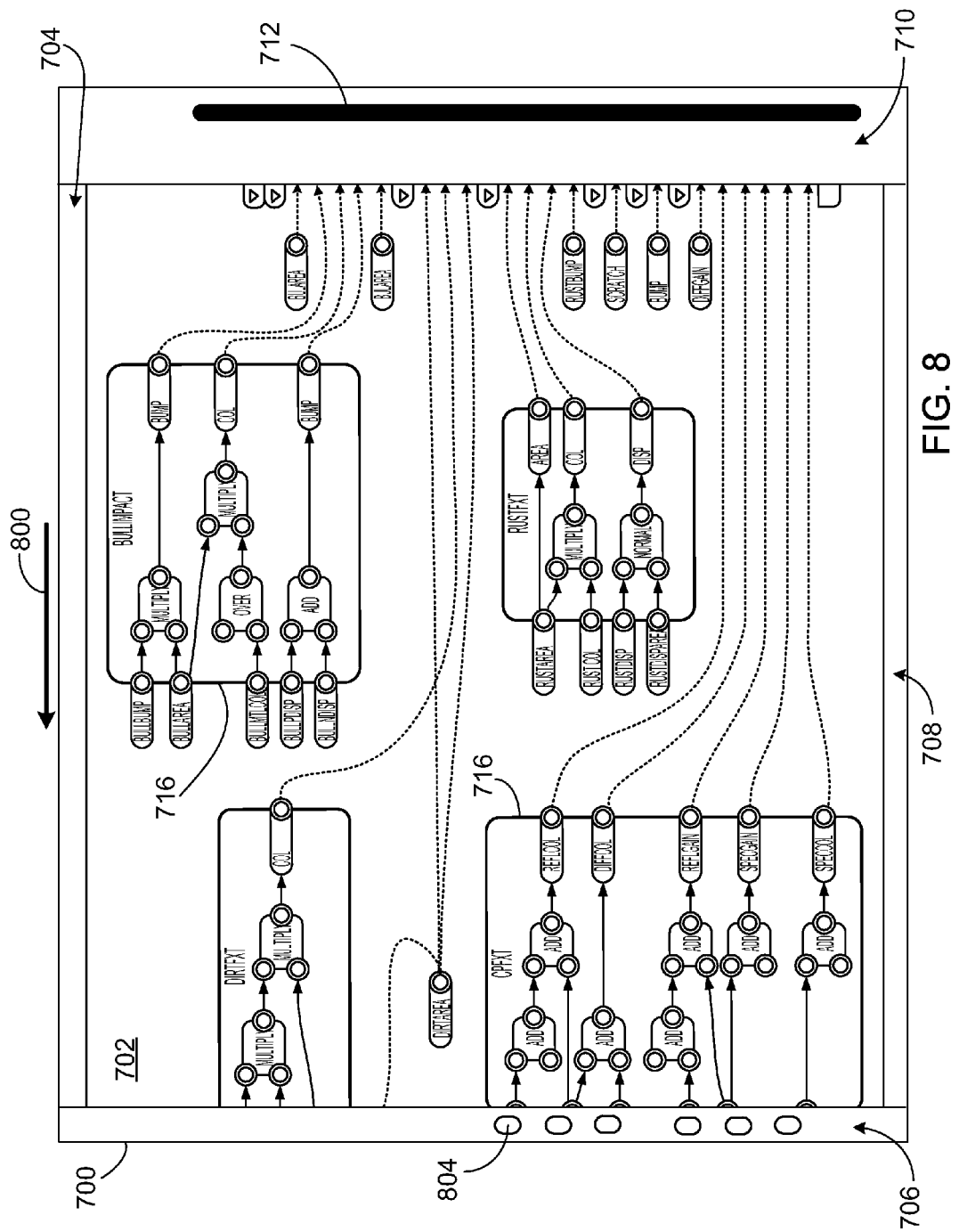

Referring to FIG. 8, the GUI 700 (from FIG. 7) is displayed after being navigated (as directed by a user) such that the workspace 702 presents another portion of the network. In this example, the workspace has been navigated slightly to the left as indicated by a direction arrow 800. Due to being navigated to a new portion of the network, the workspace 702 of the GUI 700 may be dynamically updated along with the portions 704, 706, 708, 710 of the GUI that present compressed graphics representing the portions of the network external to the workspace. For example, compared to the content of the workspace 702 shown in FIG. 7, the relative positions of the network components have shifted to the left in FIG. 8. As such, the content represented in the workspace 702 has changed along with the contents of some portions of the GUI that present compressed graphics. In particular, due to the position shift to the left, the collection of processing nodes 716 is now completely represented within the workspace 702 and the input terminals of another collection of processing nodes 802 (e.g., the collection 206 shown in FIG. 2) have extended beyond the workspace. As such, compressed graphical elements (e.g., an element 804) are represented in the portion 706 of the GUI 700 to indicate that a portion of the network is located to the left of the workspace 702. Additionally, the compressed graphical representations in the portion 706 assist in providing an overall context to the user navigating the GUI 700 with respect to the new contents of the workspace 702. Similar to the portion 706 of the GUI 700, the portion 710 may be dynamically updated to reflect the portion of the network outside of the workspace 702 to the right. For example, since the collection of processing nodes 716 is now fully represented within the workspace 702, the compressed graphical element representing the collection (e.g., element 714 shown in FIG. 7) has been removed during the updating of the portion 710 of the GUI 700. As such, only the graphical element 712 (which represents the output terminal 210 shown in FIG. 2) remains as being represented in the portion 710 of the GUI 700. Thus, along with adjusting the contents of the workspace 702, navigating to present different regions of the network also initiates corresponding adjustments to the content that assists the user by providing context of the overall network outside of the workspace.

Along with presenting compressed representations, other functionality may be provided by the portions 704, 706, 708, 710 of the GUI 700. For example, relationships may be defined among network components represented in the workspace 702 and the components represented by the compressed graphical elements. In some arrangements, connections may be established (e.g., connect an output of a component represented in the workspace 702 to a source, input terminal, etc. of a component represented by a compressed graphical element) by using a pointing device (e.g., a mouse) to drag a connection line from a component in the workspace to a compressed graphical element represented in an appropriate portion (e.g., portion 710) of the GUI. Drop down menus or other types of graphical objects may also be used to establish one or more connections (e.g., to connect to a compressed graphical element). As such, long connections may be established without laboriously dragging a connection line across an expansive portion of the graphical representation of the network. Similarly, components presented in the workspace 702 may be relatively quickly selected and moved (e.g., dragged and dropped) to another region of the network not represented in the workspace (e.g., represented in portion 710 of the GUI 700), and vice versa.

One or more techniques and methodologies may be implemented by the GUI for representing content (located outside the workspace) as compressed graphical elements. For example, one or more rules may be applied to one or more portions of the GUI external to the workspace. In one arrangement, the portion to the left of the workspace (e.g., portion 706) may only represent particular types of elements with particular connectors (e.g., only output connectors) while the portion to the right of the workspace (e.g., portion 712) may only represent elements with other types of connectors (e.g., nodes with input connectors). Such applications of rules also assist with providing an overall context of the network to a user. Other types of information may also be provided by the GUI 700. For example, by using a pointing device (e.g., hover the pointing device over a component in the workspace or a compressed graphical element) one or more displays (e.g., a heads-up display (HUD)) may be presented to user for providing information (e.g., about the component the pointing device hovers above).

Figure 9:
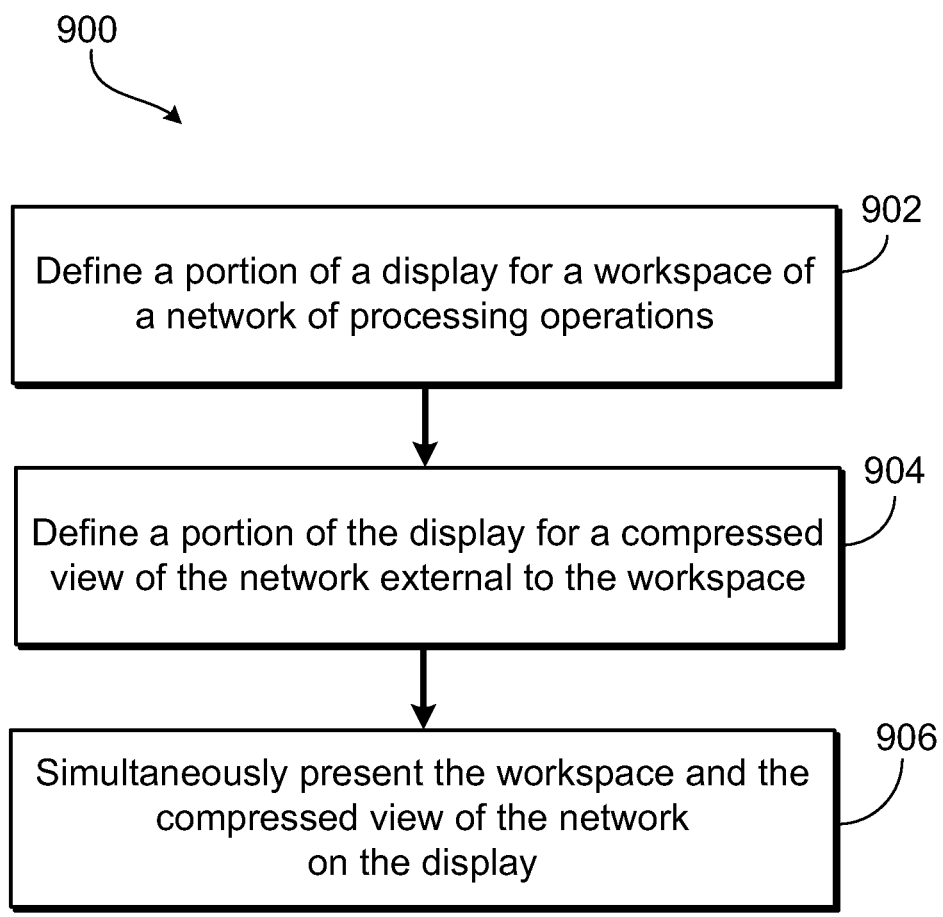
FIG. 9 is an exemplary flowchart of operations for presenting a navigable workspace and compressed graphical representations of a network of processing operations.

Referring to FIG. 9, a flowchart 900 represents operations of a computing device such as the computer system 102 (shown in FIG. 1) to produce a graphical user interface that includes a navigable workspace for working with components of a complex network (e.g., adding, removing, connecting components, etc.) and one or more portions for presenting compressed representations of the network located outside of the workspace. Such operations are typically executed by components (e.g., one or more processors) included in a computing device, however, operations may be executed by multiple computing devices. Along with being executed at a single site (e.g., at the location of the video game console), operations execution may be distributed among two or more locations.

Operations of the computing device may include defining 902 a portion of a display for a workspace for presenting a network of processing operations. For example, a workspace of a GUI may be defined for presenting a portion of the network (e.g., for reviewing and editing components in the network). Operations may also include defining 904 a portion of the display for a compressed view of the network external to the workspace. Operations also include simultaneously presenting 906 the workspace and the compressed view of the network of the display. As such, along with being able to work within a region of interest (of the network of processing operations), an overall context of the network is provided to the user. Various other types of applications may implement one or more of these techniques. For example, digital maps, or other types of presentations that include significant amounts of detailed information may be represented in a GUI that includes a workspace (for editing the information) and one or more other portions of the GUI to provide overall context (e.g., by presenting a compressed representation of the information located outside of the workspace).

Figure 10:
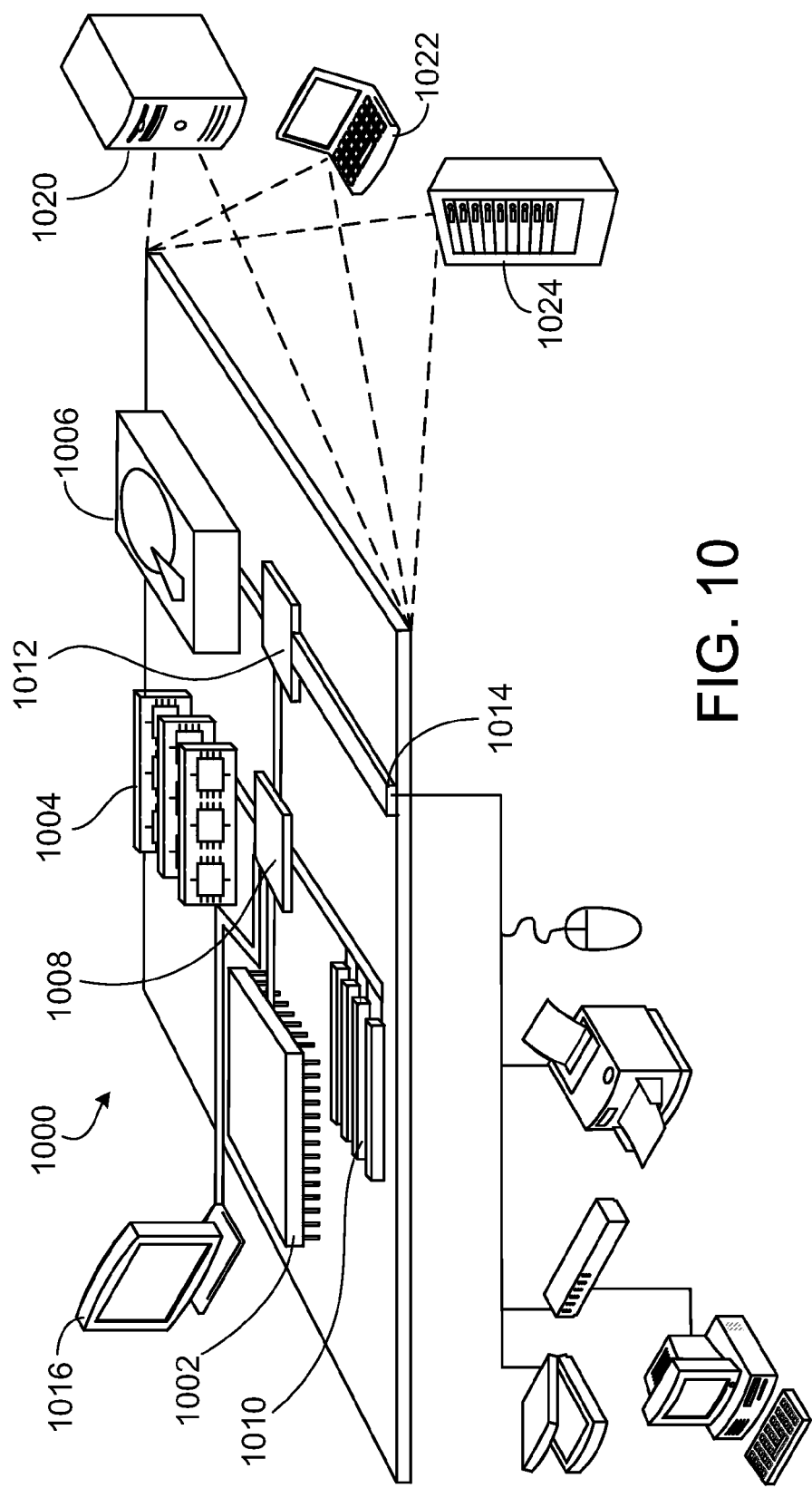
FIG. 10 is a block diagram of computing devices and systems.

FIG. 10 is a block diagram of computing devices that may be used and implemented to perform operations associated with producing and presenting user interfaces. As such, the computing devices may provide operations similar to computer systems, servers, etc. Computing device 1000 can also represent various forms of digital computers, such as tablets, cell phones, smart phones, laptops, desktops, workstations, embedded computing devices (e.g., for automobiles), personal digital assistants, servers, blade servers, mainframes, and other appropriate computers.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008 (e.g., to function as an input device such as a touchscreen, stylus/pen input, etc.). In other implementations, multiple processors and/or multiple buses can be used, as appropriate, along with multiple memories and types of memory. Also, multiple computing devices 1000 can be connected, with each device providing portions of the necessary operations (e.g., as a server bank, a group of blade servers, or a multi-processor system).

The memory 1004 stores information within the computing device 1000. In one implementation, the memory 804 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, memory on processor 1002, or the like.

The high speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1004, display 1016 (e.g., through a graphics processor or accelerator), and to high-speed expansion ports 1010, which can accept various expansion cards (not shown). In the implementation, low-speed controller 1012 is coupled to storage device 1006 and low-speed expansion port 1014. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. It can also be implemented as part of a rack server system 1024. In addition, it can be implemented in a personal computer such as a laptop computer 1022. Alternatively, components from computing device 1000 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array), an ASIC (application-specific integrated circuit), graphic processing unit (GPU), general-purpose computing on graphics processing unit (GPGPU), etc.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components or other technique (e.g., cloud computing, virtual machines, etc.). The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method of representing a plurality of processing operations for generating scenes in digital media, the method comprising:
    defining a first portion of a display, the first portion of the display comprising:
        a processing node collection comprising:
            a plurality of processing nodes representing said plurality of processing operations;
            one or more input connectors;
            one or more output connectors;
            a plurality of lines representing connections between the plurality of processing nodes, the one or more input connectors, and the one or more output connectors; and
            a first border that encompasses the plurality of processing nodes and the plurality of lines;
        an output terminal;
        one or more lines representing connections between the processing node collection and the output terminal; and
        a second border encompassing the first portion of the display;
    defining a second portion of the display, the second portion of the display sharing the second border with the first portion of the display;
    receiving a command to scroll the processing node collection inside the first portion of the display towards the second portion of the display such that a first portion of the processing node collection is displayed in the first portion of the display and a second portion of the processing node collection is cut off by a straight section of the second border and is no longer visible in the first portion of the display; and
    in response to the second portion of the processing node collection being cut off by the straight section of the second border, displaying an elongated shape in the second portion of the display, the elongated shape representing the second portion of the processing node collection, the elongated shape comprising:
        a first dimension that is parallel to the straight section of the second border between the first portion of the display and the second portion of the display, the first dimension being the same as a corresponding dimension of the processing node collection in the first portion of the display; and
        a second dimension that is perpendicular to the straight section of the second border between the first portion of the display and the second portion of the display, the second dimension being shorter than a corresponding dimension of the processing node collection in the first portion of the display.

2. The computer-implemented method of claim 1, wherein the elongated shape does not include any of the plurality of processing nodes or any of the plurality of lines representing connections that are encompassed by the second portion of the processing node collection.

3. The computer-implemented method of claim 1, wherein the elongated shape further comprises any of the one or more input connectors or any of the one or more output connectors that are part of the second portion of the processing node collection.

4. The computer-implemented method of claim 1, wherein the straight section of the second border between the first portion of the display and the second portion of the display comprises a graphical line.

5. The computer-implemented method of claim 1, further comprising:
    defining a data flow direction in the first portion of the display;
    determining that the command to scroll the processing node collection inside the first portion of the display towards the second portion of the display is in a direction that is the same as the data flow direction;
    displaying the one or more output connectors with the elongated shape in the second portion of the display, such that the elongated shape does not include any of the one or more input connectors.

6. The computer-implemented method of claim 1, further comprising:
    defining a data flow direction in the first portion of the display;
    determining that the command to scroll the processing node collection inside the first portion of the display towards the second portion of the display is in a direction that is opposite of the data flow direction;
    displaying the one or more input connectors with the elongated shape in the second portion of the display, such that the elongated shape does not include any of the one or more output connectors.

7. The computer-implemented method of claim 1, wherein connections between a second processing node collection and the second portion of the processing node collection are maintained and continuous such that the connections begin at the second processing node collection and end at the elongated shape.

8. A system for representing a plurality of processing operations for generating scenes in digital media, the system comprising:
    one or more processors;
    one or more memory devices comprising instructions that, when executed by the one or more processors, cause the one or more processors to perform operations comprising:

defining a first portion of a display, the first portion of the display comprising:
- a processing node collection comprising:
  - a plurality of processing nodes representing said plurality of processing operations;
  - one or more input connectors;
  - one or more output connectors;
  - a plurality of lines representing connections between the plurality of processing nodes, the one or more input connectors, and the one or more output connectors; and
  - a first border that encompasses the plurality of processing nodes and the plurality of lines;
- an output terminal;
- one or more lines representing connections between the processing node collection and the output terminal; and
- a second border encompassing the first portion of the display;

defining a second portion of the display, the second portion of the display sharing the second border with the first portion of the display;

receiving a command to scroll the processing node collection inside the first portion of the display towards the second portion of the display such that a first portion of the processing node collection is displayed in the first portion of the display and a second portion of the processing node collection is cut off by a straight section of the second border and is no longer visible in the first portion of the display; and in response to the second portion of the processing node collection being cut off by the straight section of the second border, displaying an elongated shape in the second portion of the display, the elongated shape representing the second portion of the processing node collection, the elongated shape comprising:
- a first dimension that is parallel to the straight section of the second border between the first portion of the display and the second portion of the display, the first dimension being the same as a corresponding dimension of the processing node collection in the first portion of the display; and
- a second dimension that is perpendicular to the straight section of the second border between the first portion of the display and the second portion of the display, the second dimension being shorter than a corresponding dimension of the processing node collection in the first portion of the display.

9. The system of claim 8, wherein the elongated shape does not include any of the plurality of processing nodes or any of the plurality of lines representing connections that are encompassed by the second portion of the processing node collection.

10. The system of claim 8, wherein the elongated shape further comprises any of the one or more input connectors or any of the one or more output connectors that are part of the second portion of the processing node collection.

11. The system of claim 8, wherein the straight section of the second border between the first portion of the display and the second portion of the display comprises a graphical line.

12. The system of claim 8, wherein the instructions cause the one or more processors to perform operations further comprising:
- defining a data flow direction in the first portion of the display;
- determining that the command to scroll the processing node collection inside the first portion of the display towards the second portion of the display is in a direction that is the same as the data flow direction;
- displaying the one or more output connectors with the elongated shape in the second portion of the display, such that the elongated shape does not include any of the one or more input connectors.

13. The system of claim 8, wherein the instructions cause the one or more processors to perform operations further comprising:
- defining a data flow direction in the first portion of the display;
- determining that the command to scroll the processing node collection inside the first portion of the display towards the second portion of the display is in a direction that is opposite of the data flow direction;
- displaying the one or more input connectors with the elongated shape in the second portion of the display, such that the elongated shape does not include any of the one or more output connectors.

14. The system of claim 8, wherein connections between a second processing node collection and the second portion of the processing node collection are maintained and continuous such that the connections begin at the second processing node collection and end at the elongated shape.

15. A non-transitory computer-readable medium for representing a plurality of processing operations for generating scenes in digital media, the medium comprising instructions that, when executed by one or more processors, cause the one or more processors to perform operations comprising:
- defining a first portion of a display, the first portion of the display comprising:
  - a processing node collection comprising:
    - a plurality of processing nodes representing said plurality of processing operations;
    - one or more input connectors;
    - one or more output connectors;
    - a plurality of lines representing connections between the plurality of processing nodes, the one or more input connectors, and the one or more output connectors; and
    - a first border that encompasses the plurality of processing nodes and the plurality of lines;
  - an output terminal;
  - one or more lines representing connections between the processing node collection and the output terminal; and
  - a second border encompassing the first portion of the display;
- defining a second portion of the display, the second portion of the display sharing the second border with the first portion of the display;
- receiving a command to scroll the processing node collection inside the first portion of the display towards the second portion of the display such that a first portion of the processing node collection is displayed in the first portion of the display and a second portion of the processing node collection is cut off by a straight section of the second border and is no longer visible in the first portion of the display; and
- in response to the second portion of the processing node collection being cut off by the straight section of the second border, displaying an elongated shape in the second portion of the display, the elongated shape representing the second portion of the processing node collection, the elongated shape comprising:
  - a first dimension that is parallel to the straight section of the second border between the first portion of the display and the second portion of the display, the first dimension being the same as a corresponding dimension of the processing node collection in the first portion of the display; and a second dimension that is perpendicular to the straight section of the second border between the first portion of the display and the second portion of the display, the second dimension being shorter than a corresponding dimension of the processing node collection in the first portion of the display.

16. The non-transitory computer-readable medium of claim 15, wherein the elongated shape does not include any of the plurality of processing nodes or any of the plurality of lines representing connections that are encompassed by the second portion of the processing node collection.

17. The non-transitory computer-readable medium of claim 15, wherein the elongated shape further comprises any of the one or more input connectors or any of the one or more output connectors that are part of the second portion of the processing node collection.

18. The non-transitory computer-readable medium of claim 15, wherein the straight section of the second border between the first portion of the display and the second portion of the display comprises a graphical line.

19. The non-transitory computer-readable medium of claim 15, wherein the instructions cause the one or more processors to perform operations further comprising:
  defining a data flow direction in the first portion of the display;
  determining that the command to scroll the processing node collection inside the first portion of the display towards the second portion of the display is in a direction that is the same as the data flow direction;
  displaying the one or more output connectors with the elongated shape in the second portion of the display, such that the elongated shape does not include any of the one or more input connectors.

20. The non-transitory computer-readable medium of claim 15, wherein connections between a second processing node collection and the second portion of the processing node collection are maintained and continuous such that the connections begin at the second processing node collection and end at the elongated shape.

* * * * *